United States Patent [19]

Truax

[11] 4,030,428
[45] June 21, 1977

[54] NATIVE GRASS SEED DRILL

[76] Inventor: James R. Truax, 3717 Vera Cruz Ave., Minneapolis, Minn. 55422

[22] Filed: Apr. 29, 1976

[21] Appl. No.: 681,596

[52] U.S. Cl. .............................................. 111/85
[51] Int. Cl.² ........................................ A01C 5/00
[58] Field of Search ................. 111/18, 34, 52, 80, 111/85; 222/177, 134, 138, 139, 140, 141, 142, 300, 308

[56] References Cited

UNITED STATES PATENTS

| 545,583 | 9/1895 | Elward | 222/142 |
|---|---|---|---|
| 905,395 | 12/1908 | West | 222/142 |
| 944,396 | 12/1909 | Wilson | 222/177 |
| 1,179,285 | 4/1916 | Crenshaw | 222/177 X |
| 2,496,885 | 2/1950 | Milton | 111/85 |
| 2,593,516 | 4/1952 | Alley et al. | 111/34 X |
| 2,713,836 | 7/1955 | Ajero | 111/80 |
| 2,899,111 | 8/1959 | Christensen | 222/177 X |
| 3,120,965 | 2/1964 | MacDonald | 111/80 X |
| 3,128,921 | 4/1964 | Henderson | 220/330 |

FOREIGN PATENTS OR APPLICATIONS

| 26,315 | 6/1906 | Austria | 111/18 |
|---|---|---|---|
| 533,073 | 8/1931 | Germany | 111/34 |
| 254,643 | 8/1927 | Italy | 111/80 |
| 25,853 | 11/1904 | Sweden | 111/80 |

Primary Examiner—Edgar S. Burr
Assistant Examiner—James R. Feyrer
Attorney, Agent, or Firm—Burd, Braddock & Bartz

[57] ABSTRACT

A grass seed drill particularly adapted for the planting of native grass type seeds which are characterized by a low density, irregular length and shape, and having a propensity to stick together. The drill has a pair of seed boxes, at least one of which is adapted to handle the aforementioned type of seeds. The seed box has a plurality of bins with downwardly converging side walls terminating at a horizontal bottom wall provided with an elongate seed discharge opening. An agitator in each bin has a plurality of rotatable blades shaped and sized to rotate about a path substantially conforming to the shape of the interior of the bin and agitate the seeds located therein. A picker wheel associated with the discharge opening discharges seeds into a transition or seed funnel located substantially directly above a drill shoe which discharges the seed into the soil. A press wheel follows the shoe to compact the soil around the seed.

13 Claims, 8 Drawing Figures

NATIVE GRASS SEED DRILL

BACKGROUND OF THE INVENTION

Standard grain drills used to plant wheat, oats, and like small grains do not function well in the seeding of native grass seed. The usual manner of spreading native grass seed is by hand broadcasting. Native grass seeds, as buffalo grass, blue stems, Indian, wild rye, brome, gramas, and the like, are bulky, low density and irregular in shape and size. These seeds are apt to stick together and can have extraneous matter intermingled therewith. The seeds might have hulls which are desirably left intact in order to provide nourishment to the planted seed. Such seeds are desirable for planting in areas to be reclaimed, such as land left barren by strip mining or highway construction. Native grass seeds are prone to clog and stick in feeder mechanisms of the prior grain drills, for example, see U.S. Pat. No. 3,128,921 to Henderson. When discharging through machines of the prior art, such native grass seeds are apt to lose their hulls or be otherwise damaged.

SUMMARY OF THE INVENTION

The invention relates to a native grass seed drill for the planting of grass seed and particularly those types of seed known as native grass. Such seed is prone to be bulky, fibrous, low density and intermingled with extraneous matter, yet the grass is useful for the reclamation of land, prevention of soil erosion, retention of top soil, and the like. It is apt to thrive where more moderate grass varieties might fail.

A preferred embodiment of the machine includes a large seed hopper or box and a small seed hopper or box. The large seed box is adapted to accommodate the native grass seed and is transversely divided into a plurality of seed bins. Each seed bin has four side walls which downwardly converge towards a horizontal bottom wall. A transverse agitator drive shaft passes through each bin and in each bin an agitator is rotatably mounted on the drive shaft. Each agitator includes a pair of blades or paddles extending from a collar mounted on the drive shaft and centrally located in the bin. These blades sweep a central path in the bin passing proximate the bottom wall of the bin. Each agitator also includes a pair of end blades, fastened to the agitator collar near opposite transverse side walls of the bin. These end blades are foreshortened as compared to the central blades and have ends which are directed inwardly towards the center of the hub whereby the end blades sweep a path which passes proximate the surface of the inclined side walls of the bin without striking them. The agitator thus serves to agitate all of the native grass seed in the bin without leaving any significant area of the bin undisturbed. If there is more than one variety of seed in the bin, the agitator serves to keep the respective varieties well mixed.

A longitudinal discharge opening is located in the bottom wall of each bin and has edges defined by a pliable, preferably rubber gasket. The agitator serves to move the grass seeds towards this opening. A picking wheel is rotatably mounted beneath the end wall of each bin and extends up through the discharge opening. The picking wheels has outer peripheral tangentially directed teeth which rotate with the wheel. Each tooth moves up through one end of the discharge opening of the bottom wall, along an arcuate path where it engages a grass seed, and down through the opposite end of the discharged opening where it discharges the grass seed into a transition or seed funnel. The seed funnel guides the grass seed in a downward path, through a convolute seed hose or tube to a drill planting shoe which deposits the seed in a furrow opened by a furrow opening assembly fastened to the shoe and located to open a furrow just ahead of the point of discharge of the seed. The path of travel of the seed is substantially directly downward eliminating any opportunity for the seed to become clogged. The throat of the seed funnel is the narrowest point in the path of the seed as it proceeds toward the shoe.

A second smaller transverse seed box is adapted to handle more conventional types of granular seeds such as clover and alfalfa. The second seed box has a plurality of transversely orientated seed bins having discharge openings at the bottom thereof. Rotatably mounted in the discharge opening of each bin is the corrugated feed roller which delivers seed from the bin into a tube which connects with the seed funnel beneath the corresponding bin of the large seed box. Grass or other seeds may be delivered from both seed boxes at once or either individually.

DESCRIPTION OF PREFERRED EMBODIMENT

Figure 1:
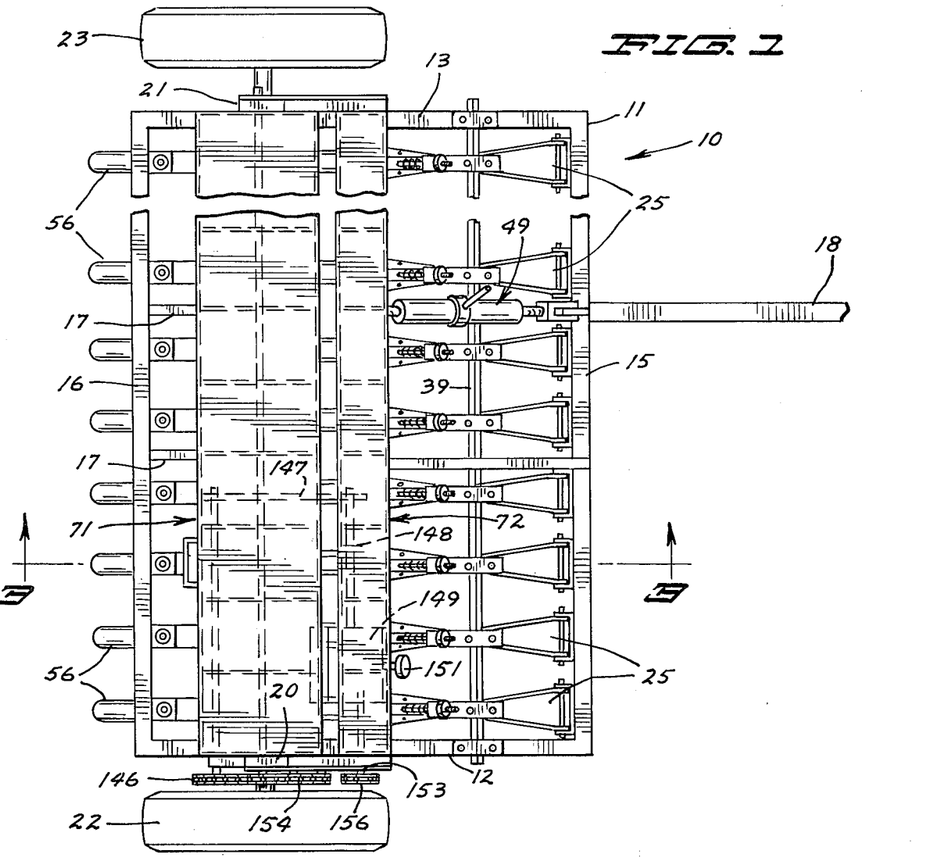
FIG. 1 is a foreshortened top plan view of a grain drill machine according to the present invention.

Referring to the drawings, there is shown in FIG. 1 a native grass seed drill or machine 10 according to the present invention. Machine 10 includes a frame 11 having longitudinal side frame members 12, 13 connected to a front lateral frame member 15 and a rear lateral frame member 16. The frame members are preferably box beams connected by welding or other suitable means. Intermediate longitudinal frame members 17 reinforce frame 11 and provide structure for mounting additional equipment. A longitudinal tongue 18 is centrally connected to the frame 11 and extends forward therefrom for connection to a tractor (not shown) or similar towing vehicle.

Figure 2:
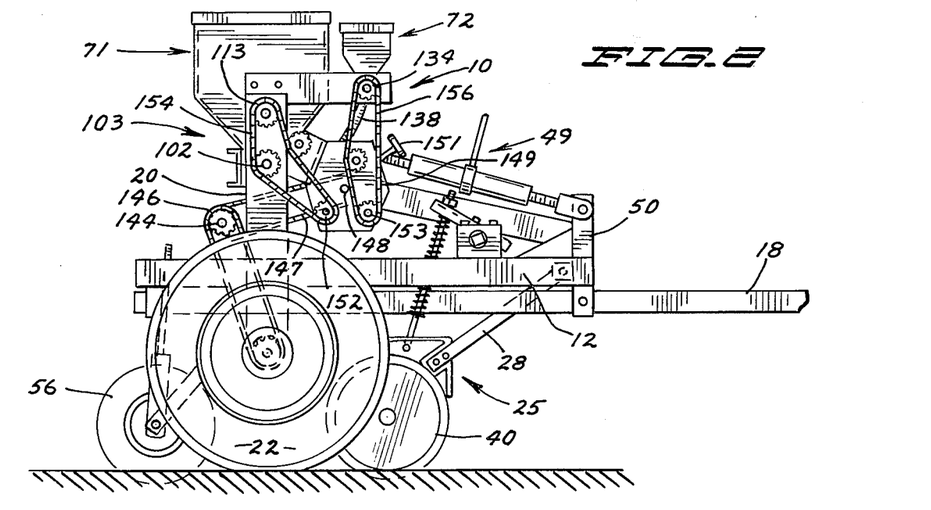
FIG. 2 is a slide elevational view of the grain drill machine of FIG. 1.

As shown in FIGS. 1 and 2, symmetrical, vertical support ports 20, 21 are attached on opposite sides of frame 11 to the longitudinal side members 12, 13, and have portions extending above and below the plane of the front, rear and side members of frame 11. Wheel assemblies 22, 23 are rotatably mounted on the lower portions of the support arms 20, 21 for wheeled mobile support of the frame 11.

Figure 3:
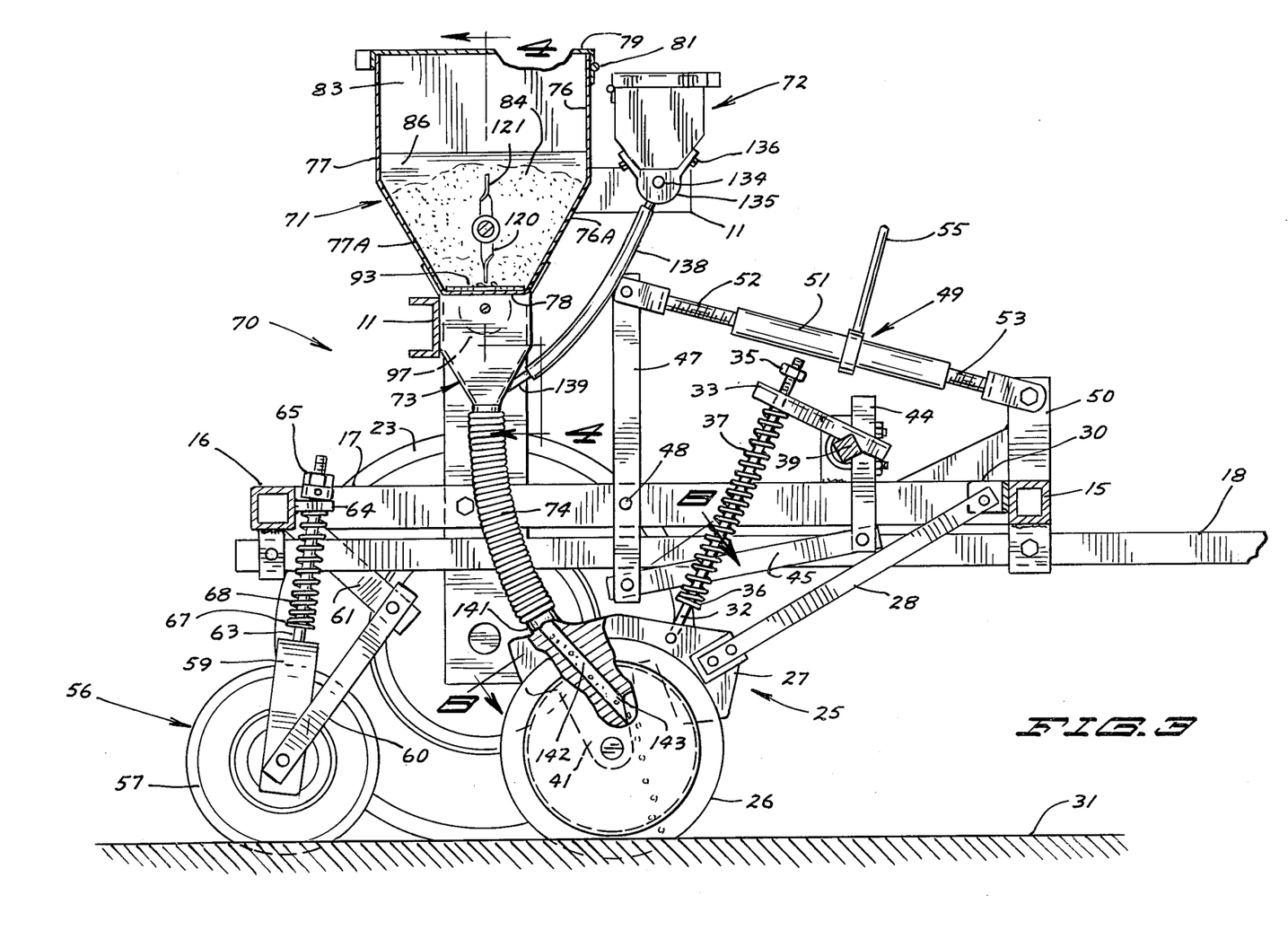
FIG. 3 is an enlarged sectional view of FIG. 1 taken along the line 3—3 thereof.

Grass seed drill machine 10 includes furrow opening equipment to open furrows in the soil or seed bed for deposit of seed, a grass seed dispensing mechanism and press wheel machinery to close seeded furrows. Machine 10 has a forwardly located array of transversely spaced furrow opening assemblies 25. As shown in FIG. 3, a furrow opening assembly 25 includes a disc assembly 26 rotatably mounted to a planting shoe 27. An attaching brace 28 is securely connected at one end to planting shoe 27 and extends angularly upward and forward therefrom. The opposite end of brace 28 is pivotally connected to a bracket 30 secured to forward lateral frame member 15. In order to bias the disc assembly 26 into furrowing engagement with ground 31, a pressure rod 32 is secured at one end to the planting shoe 27. Pressure rod 32 extends generally upward therefrom with the opposite end passing through a pressure rod arm 33 and is secured relative thereto by suitable means such as a nut 35. A collar 36 is secured to the pressure rod 32 near the lower end thereof. A compression spring 37 is disposed about pressure rod 32 between the collar 36 and the pressure rod arm 33. Compression spring 37 is operable to bear between the pressure rod arm 33 and the collar 36 on the pressure rod 32 to push downwardly on the pressure rod arm 33, the planting shoe 27, and thus the furrow opening disc assembly 26.

Pressure rod arm 33 is fixedly attached to a compression shaft 39 which is normally locked in position to thus fix the position of pressure rod arm 33. As shown in FIG. 1, the compression shaft 39 extends transversely across the frame 11 and each of the pressure rod arms 33 of the array of furrow opening assemblies 25 is fixedly attached thereto. The ends of compression shaft 39 are accommodated in suitable bearing assemblies secured to the longitudinal side members 12, 13 to permit pivotal rotation of compression shaft 39 when it is desirable to lift the furrow opening assemblies 25 out of engagement from the ground, as when machine 10 is being moved from one location to another.

Figure 8:
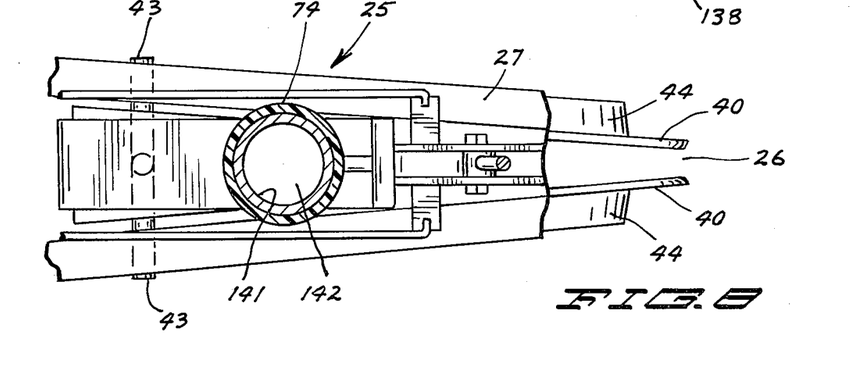
FIG. 8 is an enlarged sectional view of FIG. 3 taken along the line 8—8 thereof.

As shown in FIG. 8, disc assembly 26 of the furrow opening assembly 25 includes a pair of circular blades 40 disposed in spaced relationship with forward edges converging toward one another. The upper edges of the blades 40 are accommodated by the planting shoe 27. Planting shoe 27 has a downwardly extended leg 41 (see FIG. 3) on which the blades 40 are rotatably mounted as by pins 43. Each blade 40 has a side flange 44 spaced from the outer peripheral edge thereof which effectively limits the depth of the furrow formed by the disc assembly 26 by limiting the depth of penetration of the blades 40.

Means are provided to raise the furrow opening assemblies 25 out of furrowing engagement with the soil 31. As shown in FIG. 3, a lift bracket 44 is secured to compression shaft 39 and extends generally downwardly therefrom. A rigid link 45 connects the lower end of lift bracket 44 and the lower end of a lever arm 47. Lever arm 47 is pivotally connected as at 48 to intermediate longitudinal frame member 17 rearwardly of the compression shaft 39. A ratchet jack 49 is connected between the upper end of lever arm 47 and an upstanding fixed post 50 secured to the forward lateral frame member 43. Ratchet jack 49 has a jack body 51 and oppositely threaded shafts 52, 53 which are threaded into the jack body 51 and which are connected respectively to the upper end of lever arm 47 and the upper end of post 50. Turning of the jack body 51 as by turning the ratchet connected to handle 55 moves the shafts 52, 53 either toward or away from each other. Movement of the shafts toward one another is effective to rotate the compression shaft 39 in a direction to lift the furrow opening assemblies 25. It may be seen that the position of ratchet jack 49 is effective to lock the pivotal position of the compression shaft 39. The handle 55 is mounted on a reversible ratchet for rotation of the jack body 51. Other mechanisms, as a hydraulic cylinder, can alternately be employed to lift the furrow opening assemblies 25.

The press wheel mechanism of machine 10 includes an array of transversely spaced press wheel assemblies 56, one each in alignment with a furrow opening assembly 25 in trailing relationship to close the seeded furrow. As shown in FIG. 3, a press wheel assembly includes a press wheel 57 rotatably mounted in a bifurcated press wheel yoke 59 and a bifurcated press wheel bracket 60. The bracket 60 extends upwardly and generally forward and is pivotally connected to the end of a support arm 61. The support arm 61 extends from press wheel bracket 60 upwardly and rearwardly and is rigidly secured at the opposite end, as by welding, to the rear lateral frame member 16. A press wheel pressure rod 63 extends upwardly from the press wheel yoke 59, passing through a pressure rod arm 64 which is fixedly secured to the rear lateral frame member 16. A nut 65 on the upper end of pressure rod 63 prevents dislocation of the pressure rod from engagement with the pressure rod arm 64. A collar 67 is affixed to the pressure rod arm 63 towards the lower end thereof. A compression spring 68 is disposed in compression between the collar 67 and the pressure rod arm 64. Compression spring 68 functions to push the pressure rod 63 and therefore the press wheel 57 downwardly in engagement with the ground 31 to close the open-and-seeded furrow.

While as shown, the position of the press wheel 57 is substantially fixed, if desired suitable linkage can be provided to lift the press wheel assemblies 56 out of pressing engagement with the ground for movement of the machine from one place to another.

A seed dispensing apparatus indicated generally at 79 is mounted on the frame 11 and operates to continuously dispense a plurality of streams or bands of seeds to each of the furrow opening assemblies 25. The furrow opening assemblies 25 are operative to deposit the seeds in a furrow whereby the seeds are planted in soil in generally parallel rows. Seed dispensing apparatus has a first hopper 71 and a second hopper 72 for holding the seeds. The seeds are delivered from the hopper to a funnel 73 secured to the bottom of the first hopper. A seed tube or hose 74 carries the seeds from the funnel 73 to the furrow opening assembly. A plurality of funnels are secured to the bottom of the first hopper so that seeds are dispensed to each furrow opening assembly 25.

Figure 4:
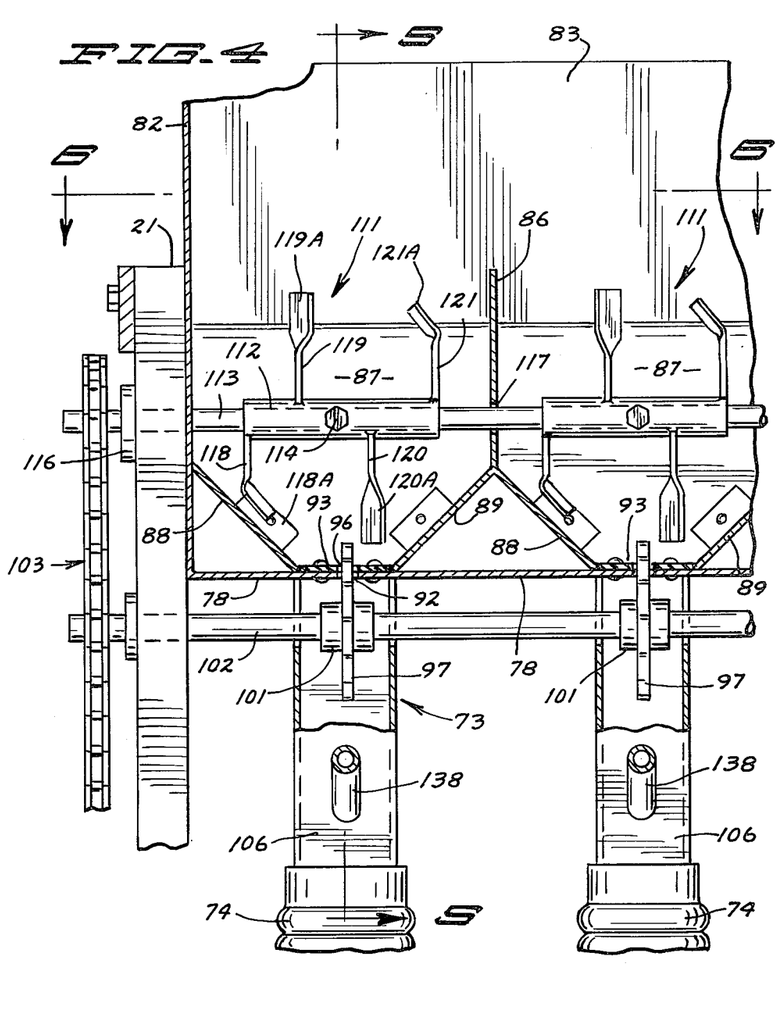
FIG. 4 is an enlarged sectional view of FIG. 3 taken along the line 4—4 thereof.
Figure 5:
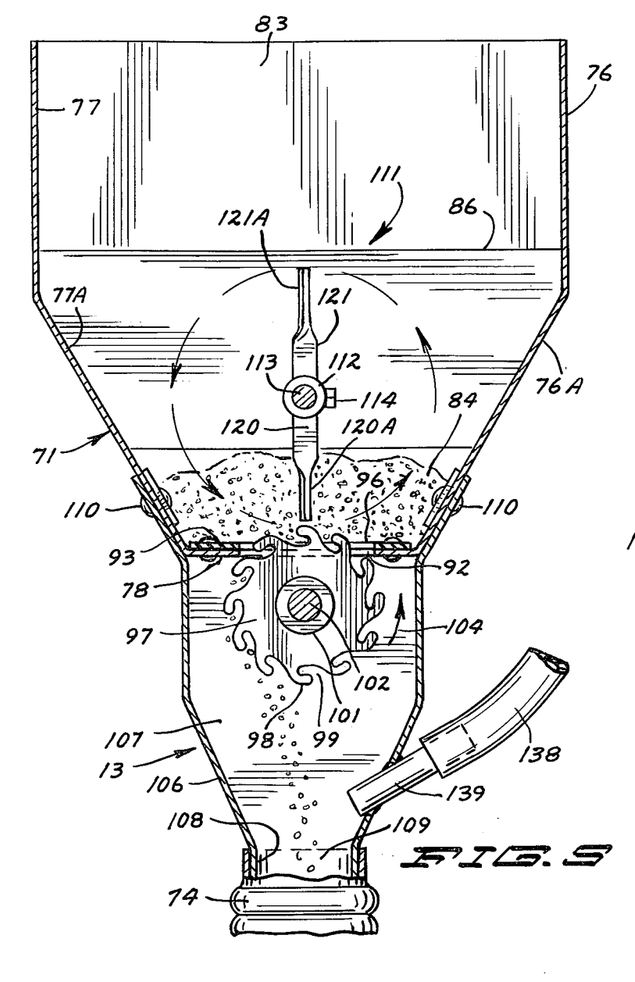
FIG. 5 is a sectional view of FIG. 4 taken along the line 5—5 thereof.
Figures 6, 7:
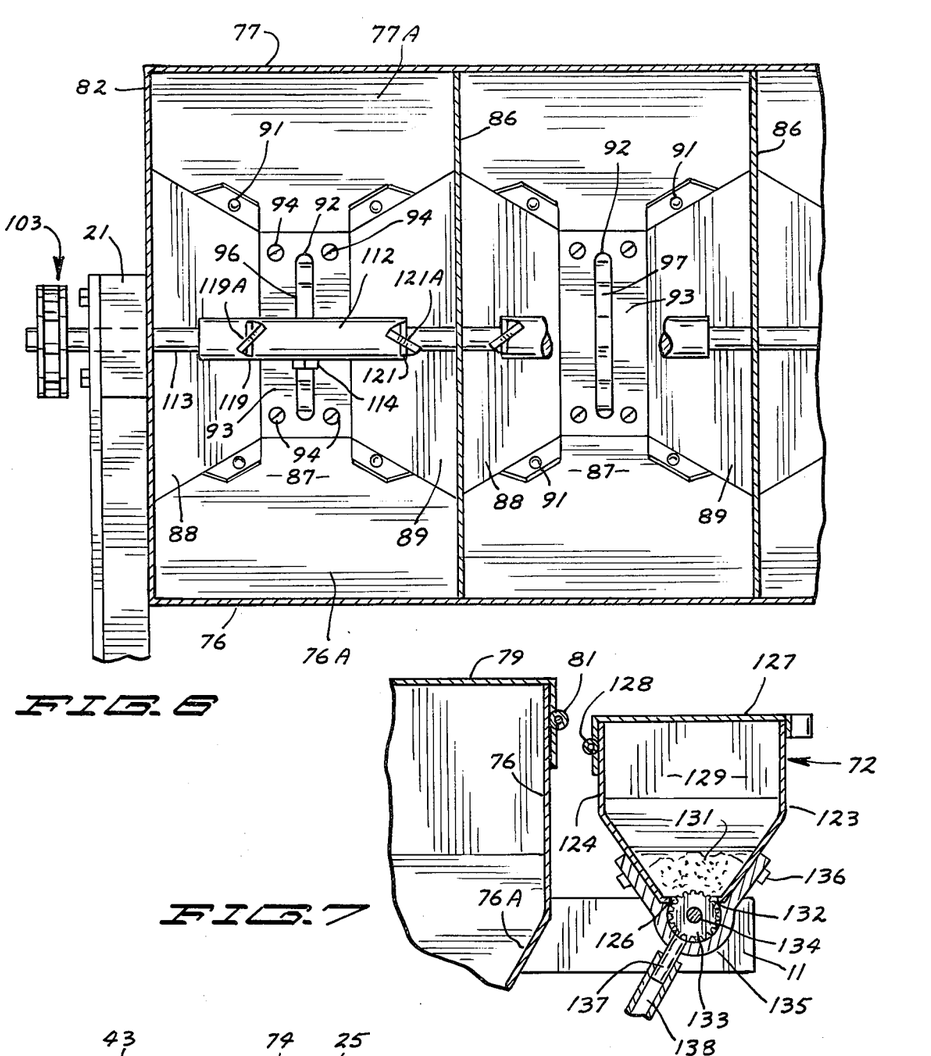
FIG. 6 is another sectional view of FIG. 4 taken along the line 6—6 thereof.
FIG. 7 is a sectional view of the small seed box of the grain drill machine of the invention.

As shown in FIG. 1, the first and second hoppers 71 and 72 extend transversely the full width of the frame 11 and are located between the wheels 22 and 23. Referring to FIGS. 3 and 5, hopper 71 has an upright front side wall 76 and an upright rear side wall 77. Side wall 76 has a lower portion at 76A that is inclined or slopes downwardly and rearwardly to a generally horizontal bottom wall 78. Side wall 77 has a lower portion 77A that slopes downwardly forwardly toward the bottom wall 76 whereby the bottom of the hopper 71 has a transverse funnel or tapered shape. The top of hopper 71 is closed with a generally flat cover 79. A hinge 81 pivotally mounts the cover on the side wall 76 so that the cover can be raised to an open position providing access to the hopper 71. The opposite ends of the hopper are closed with upright end walls 82 as shown in FIGS. 4 and 6. The hopper 71 has an elongated transverse chamber or compartment 83 defined by the walls 76, 77, 78 and 82 for carrying the native grass seed 84.

As shown in FIGS. 4 and 6, the lower half of the chamber 83 is separated with transverse dividers or plates 86 extended between the side walls 76 and 77. The plates 86 provide separate bins or chambers 87 along the transverse length of the bottom of the hopper 71. A pair of inclined plates 88 and 89 are located proximate the bottom of each bin. The plates 88 and 89 slope downwardly and inwardly toward each other and contact the bottom wall 78. Fasteners, as rivets 91, secure opposite edge portions of the plates 88 and 89 to the side wall portions 76A and 77A.

The bottom wall 78 at the center portion of the bottom of each bin has a longitudinal slot or elongated opening 92 providing a passage for the removal of seeds from the bin 87. A flexible member or retainer plate 93, as rubber or plastic, is located in the bottom of bin 87 on top of wall 78. Fasteners 94 have screws to secure the flexible member 93 to bottom wall 78. Member 93 has an elongated slot or opening 96 in vertical alignment with the slot 92 in bottom wall 78.

The seeds 84 are removed from each bin with a rotating picker wheel 97. Picker wheel 97 as shown in FIG. 5 has a plurality of outwardly and forwardly directed fingers 98 located around the outer periphery of the wheel. The fingers 98 form pockets or cavities 99 for accommodating seeds. The wheel 97 has a central hub or boss 101 mounted on a drive shaft 102. Shaft 102 is connected to a drive mechanism indicated generally at 103 operable to rotate shaft 102. The rotating shaft 102 moves the picker wheel 97 in the direction of the arrow 104. The upper part of the picker wheel extends through the slots 92 and 96 into the bottom of the bin 87. The seeds in the bin 87 are moved by the fingers 98 into the pockets 99. The moving wheel 97 carries the seeds from the bin into the funnel 73.

Funnel 73 is a housing or casing 106 having a passage 107. The upper portions of the housing 106 are secured to the side walls 76A and 77A of hopper 71 with fasteners 110, as rivets or bolts. Housing 106 has a bottom circular outlet neck 108 surrounding a throat 109. Throat 109 is located below and in general vertical alignment with the wheel 97. This ensures a free flow or drop of the seeds from wheel 97 into throat 109. The hose 74 telescopes about the outlet neck 108 and carries the seeds to the furrow opening assembly 25.

An agitator unit indicated generally at 111 is located in each bin 87. The agitator unit 11 functions to continuously stir and move the seeds in the bin thereby preventing bridging and always keeping a supply of seeds in the vicinity of the picker wheel 97. Agitator unit 111 comprises a horizontal collar or sleeve 112 mounted on a drive shaft 113. Drive shaft 113 extends through the hopper 71. Opposite ends of shaft 113 are mounted on suitable bearings 116 attached to the support posts 20 and 21. A bolt 114 threaded into collar 112 secures the collar to the shaft 113. Bolt 114 can be released so that the agitator unit can be centered in the bin 87. The dividers 86 have suitably aligned holes 117 for accommodating the shaft 113. The agitator further includes a plurality of paddles 118, 119, 120 and 121 secured to the sleeve 112. The paddles extend in an outward radial direction and are arms that move in a circumferential direction through the seeds 84. The outer ends of the paddles have blades or hands 118A, 119A, 120A and 121A, respectively The blades 118A and 121A are turned inwardly to provide for clearance with the plates 88 and 89. Blades 119A and 120A are turned to an axial direction so that the flat surface of the blade is moved through the seeds 84. The shaft 113 is connected to the drive mechanism 103 which operates to rotate the agitator unit 111 in the direction of the arrow 122 shown in FIG. 5.

Referring to FIG. 7, hopper 72 comprises an elongated transverse box having a front side wall 123 and a rear side wall 124 joined to a bottom wall 126. The lower portions of each side wall taper downwardly so that the hopper has a funnel-shaped construction. The top of the hopper is closed with a cover 127. Hinges 128 pivotally mount the cover 127 to the side wall 124 so that the cover can be moved upwardly to open the top of the hopper 72. The hopper 72 has a chamber 129 for storing seeds 131 such as clover, alfalfa, sweet clover, and other fine seeds. The bottom wall 126 has a plurality of openings 132. A fluted wheel 133 is located in each opening. The fluted wheel has a plurality of teeth and grooves or channels between the teeth for carrying seeds from the chamber 129 to a discharge passage in a hose 137. Wheel 133 is secured to a shaft 134. Shaft 134 is rotated with a drive structure hereinafter described so that the wheel 133 will rotate to dispense seed to the outlet tube 138. The wheel is located in a housing 135 secured to the side walls 123 and 124 with fasteners, as bolts 136.

An elongaged flexible hose 138 is mounted on outlet tube 137. Hose 138 has a lower end positioned on a tube 139. Tube 139 is secured to the funnel housing 109 and operable to deliver the seeds to the throat 109. Suitable gate structure (not shown) associated with the housing 135 is used to regulate the amount of seeds that are dispensed by the rotating fluted wheel 133.

Referring to FIGS. 3 and 8, the planting shoe 27 has an upright cylindrical member 141 having a large passage 142 for delivering the seed to the lower discharge opening 143. The discharge opening 143 is located between the furrow opening discs 40 forwardly of the axis of rotation of the discs. The seeds are directed into the furrow formed by the discs 40.

Returning to FIGS. 1 and 2, drive mechanism 103 drivably couples the ground engaging wheel 22 with the shaft 102, 113 and 134 so that on forward movement of the drill 10 the picker wheels 97, agitator units 111 and fluted wheels 133 will rotate to dispense seeds into the funnel 73. The drive mechanism 103 has a first transverse shaft 144 rotatably mounted on suitable bearings secured to the frame 15. A chain-and-sprocket drive 146 connects the shaft 144 with a ground engaging wheel 22. A second chain-and-sprocket drive 147 drivably connects the shaft 144 from a second transverse shaft 148 located below the hopper 72. Shaft 148 delivers power to a speed changing unit or transmission 149. The transmission 149 has a movable control rod 151 to change the speed of rotation of its output shafts 152 and 153.

A chain-and-sprocket drive 154 connects the output drive shaft 152 with the seed wheel shaft 102 and the agitator unit shaft 113. The chain-and-sprocket drive 154 operates to simultaneously rotate the shafts 102 and 113 so that the agitator unit 111 rotates at the same time that the picker wheels are rotated. A second chain-and-sprocket drive 156 connects the output shaft 153 with the shaft 134 thereby rotating the shaft 134 which in turn rotates the fluted wheels 133 to dispense seed from the hopper 72 into the tubes 138. The seed in the tubes 138 is delivered to the funnel where it is directed into the flexible hose 74 and the furrow opening assembly 25.

In use, drill 10 is coupled to a towing vehicle such as a tractor. The native grass seeds are placed in the hopper 71. Other seeds, such as the fine clovers and the like, are placed in the hopper 72. The drill 10 is moved over the seed bed with the furrowing assemblies 25 located in their down positions. The ratchet jack 49 is adjusted to hold the furrowing discs 40 in a fixed position in the ground.

The ground engaging wheel 22 operates the drive mechanism 103 to rotate the shaft 102, shaft 113 and shaft 134. The picker wheels 97, being mounted on the shaft 102, are rotated to carry seed from each bin into its associated funnel. During rotation of the shaft 102, the shaft 113 is rotated with the chain-and-sprocket drive 154. This continuously rotates the agitator units 111 in each of the bins. The paddles 118, 119, 120 and 121 of each agitator unit continuously move in circular paths through the seeds 84 in the bins. This continuously agitates and mixes the seeds in the bins and ensures a continuous supply of seeds for the picker wheel 97. The seeds are moved behind the fingers 98 on the wheels into the pockets 99 and carried through the slot in the flexible member 93. After the fingers pass through the slot 92, they fall from the fingers through the housing passage 107 to the throat 109. The seeds then move through the large passage in the convoluted hose 74. The hose 74 delivers the seed to the planter shoe 27 which directs the seed into the furrow opened by the discs 40. The seeds are dispensed in continuous rows which are closed and compacted with soil by the press wheels 56.

The drive mechanism 103 also rotates the shaft 134 through the chain-and-sprocket drive 156. The fluted wheels 133 secured to shaft 134 dispense seeds from the hopper 72 into the flexible tubes 138. The tubes 138 deliver the seeds to the funnel structures where they fall through the hose 74 and planter shoe 27 and into the furrow.

While there has been shown and described a preferred embodiment of the invention, it is understood that changes in the structures, materials and relationships between the structures can be made by those skilled in the art without departing from the invention. The invention is defined in the following claims.

The embodiments of the invention in which an exclusive property or privilege is claimed are defined as follows:

1. An apparatus for planting native grass seed in the soil comprising: a frame, wheels rotatably mounted on the frame for supporting the frame for movement on the soil, a seed box mounted on the frame, said box having side walls and a bottom wall defining a chamber for storing native grass seed, a plurality of dividing plates separating the lower portion of said chamber into a plurality of transversely spaced seed bins, downwardly converging side walls associated with each of the dividing plates to provide each bin with downwardly converging surfaces for directing seeds to the bottom wall of each bin, an elongated discharge slot located in the bottom wall of each bin, flexible means located on the bottom wall in each bin, said flexible means having an elongated opening positioned in vertical alignment with the slot in the bottom wall of the bin, picker wheel means rotatably mounted on the frame, said picker wheel means having upper portions which extend through the discharge slots and elongated openings of the flexible means of each bin for moving seeds from the bins, an agitator unit located in each bin to continuously stir and move the seeds in the bin to keep a supply of seeds in the vicinity of the picker wheel means, each agitator unit having a plurality of paddles operable to agitate the seeds in the bins, said plurality of paddles including first and second end paddles terminating in ends that move adjacent the inclined surfaces of the side wall of each bin, means for rotating the agitator means and wheel means, a plurality of seed funnels attached to the seed box, said seed funnels being located below the bottom wall of the seed box and aligned with each of the wheel means and having a seed passage for receiving the seeds from the picker wheel means, each funnel having a neck surrounding a throat located below the picker wheel means, a plurality of furrow opening assemblies movably mounted on the frame operable to make a furrow in the soil, each furrow opening assembly including a planting shoe and furrow forming means, elongated flexible tubes attached to the outlet necks of the seed funnels and the planting shoes for delivering the seeds from the seed funnels to the planting shoes, said planting shoes having sufficiently large discharge openings for directing the seeds into the furrows.

2. The apparatus of claim 1 including: means for movably mounting the furrow opening assemblies on the frame to position the furrow opening assemblies in a planting position or a transport position, and rigid link means connected to the frame and the means for movably mounting the furrow opening assemblies to hold the furrow opening assemblies in their planting positions.

3. The apparatus of claim 2 wherein: said rigid link means is an adjustable ratchet jack.

4. The apparatus of claim 1 wherein: each flexible means is a flat flexible retainer plate located on the bottom wall of each bin and secured thereto, each retainer plate having an elongated opening in vertical alignment with the slot for accommodating a portion of the picker wheel means.

5. The apparatus of claim 1 wherein: each picker wheel means comprises a generally flat member having outwardly and forwardly directed fingers forming pockets for accommodating seeds.

6. The apparatus of claim 1 wherein: each agitator unit includes four paddles, each paddle having a blade at its outer end for agitating the seeds in the bin.

7. The apparatus of claim 1 wherein: each seed tube is an elongated, corrugated and flexible hose having an upper end mounted on the outlet neck of the seed funnel and a lower end attached to the planting shoe.

8. The apparatus of claim 1 including: a second seed box transversely mounted on the frame, and means operably connected to the second seed box to move seed from the second seed box to each seed funnel whereby seeds are planted in the soil with the native grass seeds.

9. A native grass seed drill comprising:
a frame;
wheels rotatably mounted on the frame for wheeled support of the frame for movement over the soil;
a seed box transversely mounted on the frame having a front wall, a rear wall, end walls and a bottom wall defining a chamber;

said front and rear walls being inwardly and downwardly inclined with respect to the chamber;
a plurality of dividing plates dividing said chamber into a plurality of transversely orientated seed bins having downwardly converging front and rear walls;
each bin also having downwardly converging side walls;
an elongate, longitudinal discharge slot located in the bottom wall of each bin;
a flexible retainer plate located on the bottom wall of each bin secured thereto and having an elongate opening in vertical alignment with the slot in the bottom wall of the bin;
a picker wheel rotatably mounted beneath the bottom wall of each bin and having an upper portion extending through said discharge slot and elongated opening of the plate into the bin, said picker wheel having forwardly directed fingers forming pockets for accommodating seeds and moving the seeds out of the bin;
an agitator unit located in each bin to continuously stir and move seeds in the bin to keep a supply of seeds in the vicinity of the picker wheel in the bin, each agitator unit having a transverse sleeve mounted on a rotatable agitator drive shaft, a plurality of paddles extending from the sleeve, the outer ends of the paddles having blades to agitate seeds in the bin, said plurality of paddles including end paddles located on said sleeve proximate the side walls of the bin, the blades of said end paddles being turned inwardly to provide clearance with the side walls;
means connected to one of the frame wheels for rotation of the agitator drive shaft and picker wheels upon rotation of the frame wheel;
a seed funnel attached to the outside of the walls of each bin vertically beneath and covering the discharge slot to receive seeds moved through the discharge slot by the picker wheel, each said seed funnel having a housing defining a seed passage, an outlet neck defining a throat located below and in general vertical alignment with the picker wheel;
a seed tube attached at one end to the outlet neck of each seed funnel;
a plurality of furrow opening assemblies mounted on said frame in furrow-opening relationship to the ground, one furrow-opening assembly corresponding to each seed bin;
each furrow-opening assembly including a planting shoe secured to said frame and a furrow-opening disc assembly attached to the planting foot;
the opposite end of said seed tube being connected to the planting shoe; and
said planting shoe having a seed discharge opening for the discharge of seeds behind the furrow-opening disc assembly.

10. The drill of claim 9 including: a second seed box transversely mounted on the frame, means operably connected to the second seed box to move seed from the second seed box to each seed funnel whereby seeds are planted in the soil with the native grass seeds.

11. The drill of claim 9 wherein: each seed tube is an elongated and flexible hose mounted on the outlet neck of the seed funnel and attached to the planting shoe.

12. The drill of claim 9 including: means for movably mounting the furrow opening assemblies on the frame, and ratchet jack means connected to the frame and means for movably mounting the furrow opening assemblies to hold the furrow opening assemblies in the furrow opening positions.

13. The drill of claim 9 wherein: each agitator unit has four paddles, each paddle having a blade for agitating seeds in the bin.

* * * * *

UNITED STATES PATENT AND TRADEMARK OFFICE
CERTIFICATE OF CORRECTION

PATENT NO. : 4030428
DATED : June 21, 1977
INVENTOR(S) : James R. Truax

It is certified that error appears in the above-identified patent and that said Letters Patent are hereby corrected as shown below:

Column 1, line 64, "wheels" should be --wheel--

Column 2, line 1, "discharged" should be --discharge--

Column 1, line 28, "slide" should be --side--

Column 4, line 39, "79" should be --70--

Column 5, line 51, "11" should be --111--

Signed and Sealed this

Fourth Day of October 1977

[SEAL]

Attest:

RUTH C. MASON
Attesting Officer

LUTRELLE F. PARKER
Acting Commissioner of Patents and Trademarks